United States Patent [19]
Johnson

[11] 4,373,396
[45] Feb. 15, 1983

[54] MECHANICAL FILTER WITH ACOUSTIC SENSING

[75] Inventor: Robert A. Johnson, Tustin, Calif.

[73] Assignee: Rockwell International Corporation, El Segundo, Calif.

[21] Appl. No.: 189,418

[22] Filed: Sep. 22, 1980

[51] Int. Cl.³ .................... G01H 13/00; G01L 23/22
[52] U.S. Cl. ........................................ 73/651; 73/35; 73/579
[58] Field of Search ................ 73/651, 579, 649, 35

[56] References Cited
U.S. PATENT DOCUMENTS

| | | | |
|---|---|---|---|
| 2,424,864 | 7/1947 | Treseder | 73/651 |
| 4,255,965 | 3/1981 | Schulz et al. | 73/35 |
| 4,275,586 | 6/1981 | Gast et al. | 73/35 |

*Primary Examiner*—Stephen A. Kreitman
*Attorney, Agent, or Firm*—Michael E. Taken; Bruce C. Lutz; Howard R. Greenberg

[57] ABSTRACT

A mechanical bandpass filter with acoustic sensing is disclosed, including a particularly advantageous implementation enabled thereby in the detection of automobile engine knock. A pair of cantilever beam resonators of different resonant frequencies are connected at their nodes to a single in-phase velocity source which is directly acoustically driven and which has an infinite stiffness relative to the flexure mode resonators. The resonators have piezoelectric transducers of opposite polarity electrically coupled in such a relation as to define upper and lower attenuation stopbands due to signal cancellation and to define a passband frequency, due to signal reinforcement. The passband corresponds to the frequency range between and around the resonant frequencies of the two resonators. The invention provides a wide bandwidth without spurious response mode effects.

8 Claims, 4 Drawing Figures

MECHANICAL FILTER WITH ACOUSTIC SENSING

BACKGROUND

The present invention evolved from efforts to provide an acoustic sensor for the knock or ping of an automobile engine for controlling engine timing to afford better gas mileage.

Improved mileage can be obtained by controlling the engine timing such that the engine operates with a slight knock or ping. The knock must be detectable to a measurement device but not to the human ear. A bandpass filter may be used in conjunction with an acoustic sensor for filtering all extraneous noise and delivering the resultant knock-responsive signal to the timing circuit of the engine. The filtering can be electrical, but ideally the filter and sensor are one.

The simplest arrangement is to make the filter part of the sensor and mount it directly to the engine block or manifold for sensing the sound waves of the vibrational frequency generated by the knock (typically around 5 kHz). The resonator means should be directly acoustically driven to eliminate the need for a separate sensor and electrical input transducers. From this mechanical input, the filter should generate an electrical output with a relatively wide bandwidth and non-spurious response mode effects.

Various types of mechanical bandpass filters were considered but rejected because of complexity, high cost, too many components, poor performance, or because they were not amenable to the application requirements. Single-resonator filters are not suitable because of their limited selectivity. Conventional multiple-resonator acoustically coupled filters provide wide bandwidth but suffer from problems with spurious modes as the bandwidth increases.

SUMMARY

The present invention provides a simple mechanical bandpass filter effective over a wide bandwidth without spurious response mode effects.

A pair of resonators are driven in flexure mode vibration by a single in-phase velocity source connected at the nodal point of each resonator. The resonators are of different resonant frequencies and have transducers, such as piezoelectric elements, electrically coupled in phase-inverted relation to generate cancelling voltages outside the frequency passband. The generated voltage has spaced amplitude peaks near the two resonant frequencies generally defining the passband.

A significant aspect of the invention is recognition of the implementation enabled thereby in detection of engine knock. The invention enables the filter to be mounted directly to the engine block or manifold and provide a wideband non-spurious response. This successful solution over previous unsuccessful attempts in wideband non-spurious engine knock detection is considered a significant advance, particularly in its simplicity and efficiency.

DETAILED DESCRIPTION

Figure 1:
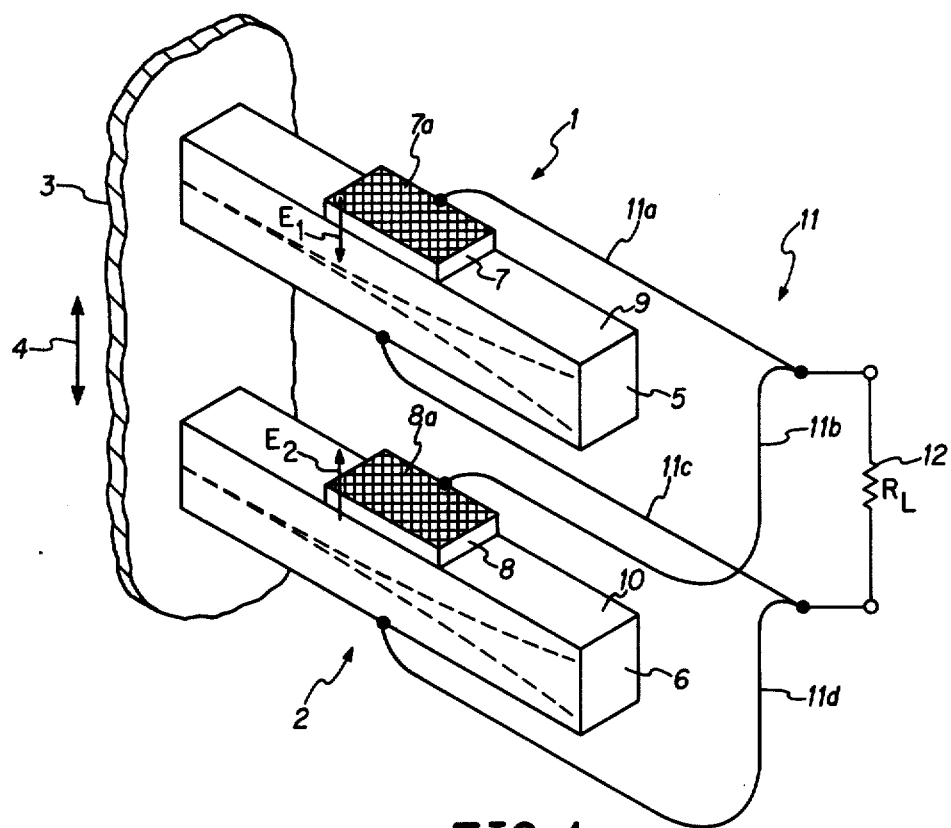
FIG. 1 is a pictorial illustration of a mechanical bandpass filter constructed in accordance with the invention.

FIG. 1 shows a mechanical bandpass filter with acoustic sensing for transforming a mechanical input to an electrical output. A pair of flexure mode resonators 1 and 2, having different resonant frequencies $f_1$ and $f_2$, are nodally connected to a source of velocity. The source of velocity may take various forms. In preferred form, a velocity source 3 is provided by a mount or support of substantially infinite stiffness relative to resonators 1 and 2 and is responsive to acoustic waves to be driven thereby to vibrate back and forth in the direction shown at 4 at constant velocity (i.e. the velocity is not influenced by the resonators).

The resonators comprise metal cantilever bars 5 and 6 which flexurally vibrate, as shown by the dashed lines, in response to the vibrational movement of velocity source 3. The resonators have transducer means 7 and 8 for generating an electrical output from flexural vibration.

The transducers are opposite polarity piezoelectric transducers mounted to the cantilever bars on top surfaces 9 and 10, which surfaces face toward a common direction. When resonators 1 and 2 are flexed in the same direction, the electric field $E_1$ between the plated surface 7a and metal bar 5 and the electric field $E_2$ between the plated surface 8a and metal bar 6 are opposite in sign. Coupling means 11 couples the electrical outputs of the transducers in parallel to a terminating load resistance 12. Electrical connection lead wires 11a and 11b connect plates 7a and 8a in parallel to one side of the load and wires 11c and 11d connect bars 5 and 6 in parallel to the other side of the load.

In operation, the solid resonator support 3 vibrates and causes the two resonators 1 and 2 to vibrate in a flexural mode. The flexural vibration causes transducer 7 to expand and contract, causing an electric field to be created and a voltage to be generated across its output connections 11a and 11c. Transducer 8 likewise generates a voltage across its output connections 11b and 11d. The parallel connection of the outputs provides a cancelling relation between the voltages such that the net voltage across load 12 is substantially zero at frequencies removed from the resonant frequency ranges $f_1$ and $f_2$ of resonators 1 and 2.

Figure 2:
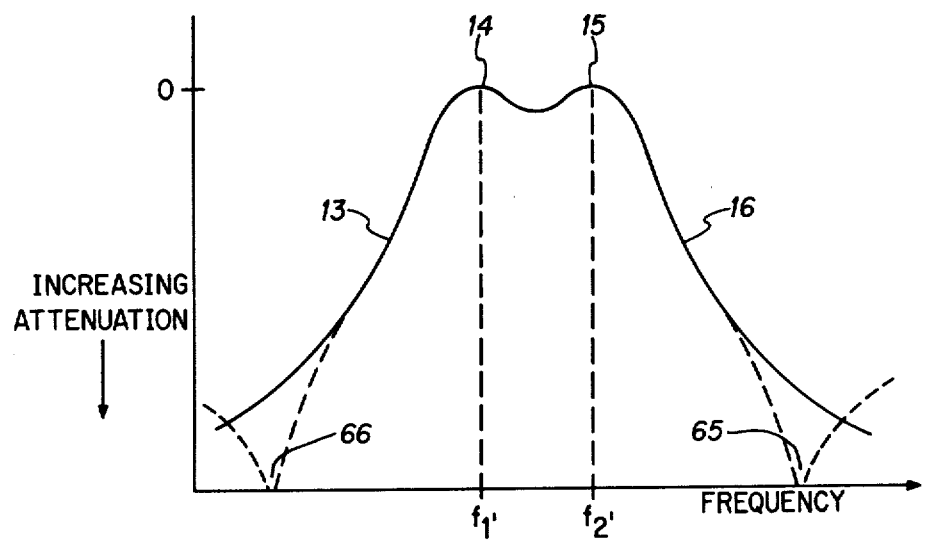
FIG. 2 is a graph showing the response curve of the filter of FIG. 1.

Referring to FIG. 2, as the applied frequency increases toward $f_1$ the amplitude of vibration of bar 5 increases and a correspondent increased voltage appears across load 12. This increasing signal output is shown at 13. At some frequency value $f_1'$ (corresponding to $f_1$ but generally not equal to $f_1$, the exact location being a function of the electromechanical coupling coefficients and the terminating resistance), there is an amplitude peak in the response curve at 14 due to maximal resonance of resonator 1. Similarly, another response peak occurs at 15 for frequency $f_2'$. At higher frequencies, the response again decreases as at 16 due to cancellation.

There is thus defined a passband frequency range corresponding to the range between and around $f_1$ and $f_2$ due to the increased amplitude of vibration, and defining a stopband with increasing attenuation farther away from the passband. The further the driving frequency is removed from the passband, the greater the cancellation. As the resonant frequency of resonator 1 is approached, its amplitude of vibration becomes much greater than that of resonator 2, and the output voltage of resonator 2 is not enough to cancel the output voltage of resonator 1. Similar dominance by resonator 2 occurs at its resonant frequency.

Midway between $f_1'$ and $f_2'$, the resonators are on opposite sides of their resonance curves and therefore are vibrating out of phase, which means that the voltages generated across the transducers are in-phase and additive (the amplitudes are out-of-phase but so are the polarities of the transducers). As the frequency approaches $f_2'$, the amplitude of resonator 2 becomes large with respect to that of resonator 1 and a high amplitude (low attenuation) is maintained. As the frequency increases above $f_2'$ the response is that shown at 16 and both bars are vibrating in-phase, but because the transducers have opposite polarities the output signals tend to cancel.

Figure 3:
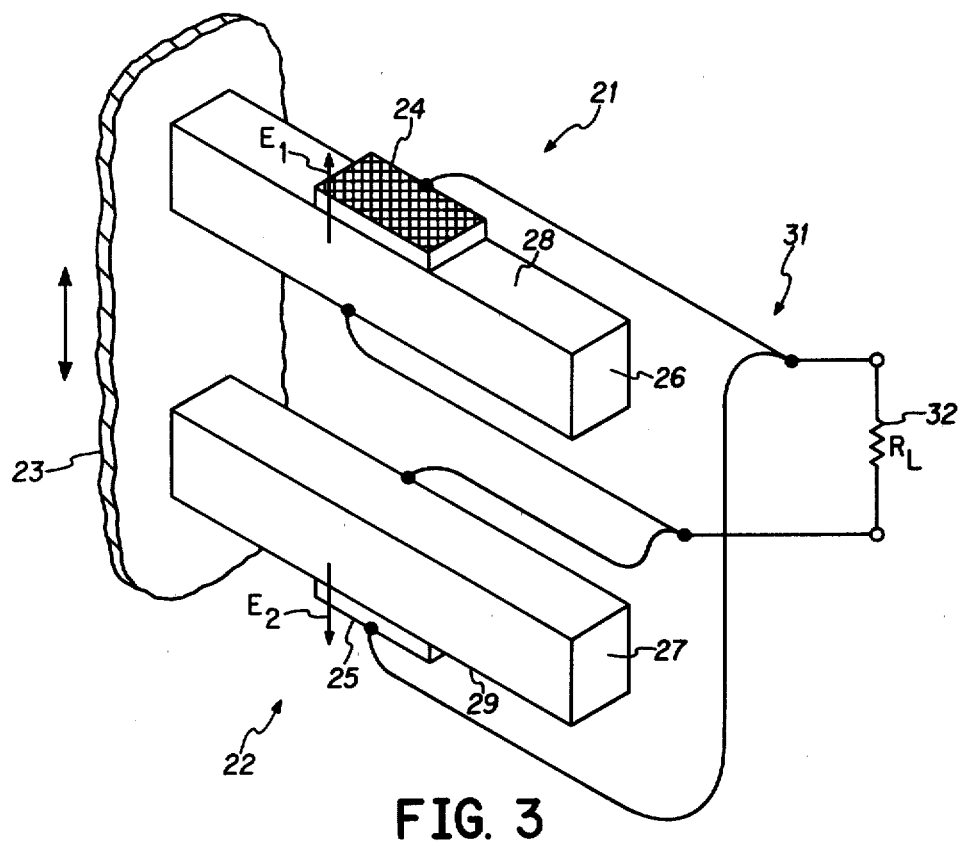
FIG. 3 is a pictorial illustration of an alternate embodiment.

In FIG. 3, resonators 21 and 22 are driven in flexural vibration by velocity source 23. Common polarity piezoelectric transducers 24 and 25 are mounted to cantilever bars 26 and 27 on top and bottom surfaces 28 and 29, respectively, which face opposite directions to generate the electric fields $E_1$ and $E_2$ as shown. The electrical outputs of the transducers are connected in parallel by coupling means 31 across terminating load resistance 32, as shown. This provides the same type of cancelling relation as the response curve in FIG. 2 to define a passband frequency range corresponding to the range between and around the resonant frequencies $f_2$ and $f_1$ of resonators 22 and 21 due to increased amplitude of vibration, and defining a stopband with increased attenuation farther away from the passband.

Figure 4:
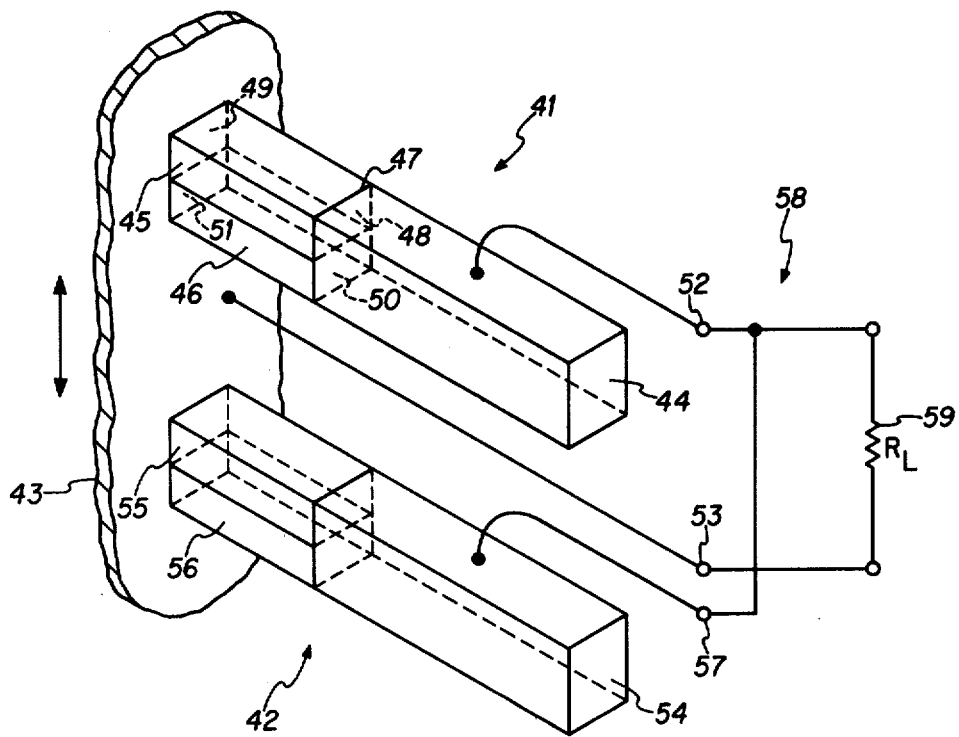
FIG. 4 is a pictorial illustration of another embodiment.

In FIG. 4, resonators 41 and 42 are driven in flexural vibration by velocity source 43. Resonator 41 includes a cantilever bar 44 and a pair of piezoelectric transducers 45 and 46 mounted at the root 47 of bar 44 between the bar and velocity source 43. Transducers 45 and 46 are polarized along their length in opposite directions, bonded together, and then bonded at one end to the root end 47 of bar 44, followed by bonding at the other end to velocity source 43. As resonator 41 is driven in flexure by velocity source 43, the flexural vibrations will cause expansion along the length of one transducer and contraction along the length of the other.

Because the transducers are polarized in opposite directions, the voltages across plated end surfaces 48 and 49, and 50 and 51 will add, causing a voltage to be generated across terminals 52 and 53. Resonator 42 is similar, with cantilever bar 54 and piezoelectric transducers 55 and 56 oppositely polarized along their length. The composite transducer pair 55,56 is oppositely polarized to the transducer pair 45, 46. When the resonators flex in the same direction, resonator 42 thus generates a voltage across output terminals 57 and 53 which is opposite to that across terminals 52 and 53. Coupling means 58 connects the outputs in parallel across terminating resistance 59 in cancelling relation to provide the type of response shown in FIG. 2.

The invention enables a particularly desirable implementation for direct acoustic detection of knock in an internal combustion engine. Referring to FIG. 1, velocity source 3 may be the engine block or manifold, or a mount or support directly and rigidly mounted to the engine block or manifold and having a substantially infinite stiffness relative to cantilever bars 5 and 6. Source 3 responds to the acoustic waves generated by knock and is directly acoustically driven thereby to move back and forth at constant velocity. The different resonant frequencies $f_1$ and $f_2$ of the resonators provide a wide bandwidth. The single in-phase velocity source and nodal connection suppresses spurious response mode effects. In one specific design, $f_1$ was 4,875 Hertz and $f_2$ was 5,225 Hertz.

The invention is susceptible to numerous variations and refinements. For example, the network may be modified to achieve attenuation poles by changing the electromechanical coupling coefficients, or changing the ratios of the static capacitances of the transducers to the acoustic capacitances of the mechanical resonators. The coupling coefficients and the capacitances can be changed by varying the relative sizes of the transducers in area and/or thickness. An attenuation pole such as 65, FIG. 2, on the high frequency side of the passband is produced by decreasing the capacitance (size) of transducer 7 below a given value. For example, an attenuation pole was generated at a frequency of about 7 kHz for a capacitance ratio of about 1:4 between the above noted static and acoustic capacitances for the lower frequency resonator 1. Increase of the static capacitance moves the attenuation pole closer to the passband. An attenuation pole is produced on the low frequency side of the passband, as at 66, FIG. 2, by increasing the static capacitance of transducer 8 of the high frequency resonator 2. The amount of passband ripple may be controlled or flattened by adjusting resistance 12. If needed, a wider passband width may be provided by acoustic damping means on or between the resonators, for example by coating the resonator with a silicone material.

It is recognized that numerous modifications are possible within the scope of the appended claims.

I claim:

1. A mechanical bandpass filter driven by a velocity source, comprising:

a first flexure mode cantilever bar resonator having a resonant frequency $f_1$ and nodally connected to said velocity source, and having transducer means for generating an electrical output from flexural vibration;

a second flexure mode cantilever bar resonator having a resonant frequency $f_2$ and nodally connected to said velocity source, and having transducer means for generating an electrical output from flexural vibration;

means coupling the electrical outputs of said transducer means to define a passband frequency range corresponding to the range between and around $f_2$ and $f_1$ due to increased amplitude of vibration, and to define a stopband by signal cancellation with increasing attenuation farther away from said passband; and impedance means $R_L$ connected across said electrical outputs of said transducer means for controlling the passband ripple of said mechanical bandpass filter.

2. The invention according to claim 1 wherein said first and second resonators comprise spaced cantilever bars.

3. The invention according to claim 2 wherein said transducer means of said first and second resonator are electrically coupled in phase inverted relation to generate additive voltages within said passband and cancelative voltages outside said passband.

4. The invention according to claim 3 wherein said transducer means of said first and second resonators comprise respective first and second opposite polarity piezoelectric transducers mounted to said bars on surfaces facing toward a common direction, and said coupling means couples the electrical outputs of said transducers in parallel.

5. The invention according to claim 3 wherein said transducer means of said first and second resonators comprise respective first and second common polarity piezoelectric transducers mounted to said bars on surfaces which face opposite directions, and said coupling means couples the electrical outputs of said transducers in parallel.

6. The invention according to claim 3 wherein said transducer means of said first resonator comprises piezoelectric transducer means mounted at the root of said first bar between said first bar and said velocity source;

and wherein said transducer means of said second resonator comprises piezoelectric transducer means mounted at the root of said second bar between said second bar and said velocity source.

7. The invention according to claim 6 wherein said transducer means of said first resonator comprises a pair of piezoelectric transducers polarized along their length in opposite directions, bonded together along their length, and bonded at one end to the root end of said first bar and bonded at the other end to said velocity source;

and wherein said transducer means of said second resonator comprises a pair of piezoelectric transducers polarized along their length in opposite directions, bonded together along their length, and bonded at one end to the root end of said second bar and bonded at the other end to said velocity source.

8. A mechanical bandpass filter driven by a velocity source, comprising:

a first flexure mode cantilever bar resonator having a resonant frequency $f_1$ and nodally connected to said velocity source, and having transducer means for generating an electrical output from flexural vibration;

a second flexure mode cantilever bar resonator having a resonant frequency $f_2$ and nodally connected to said velocity source, and having transducer means for generating an electrical output from flexural vibration;

means coupling the electrical outputs of said transducer means to define a passband frequency range corresponding to the range between and around $f_2$ and $f_1$ due to increased amplitude of vibration, and to define a stopband by signal cancellation with increasing attenuation further away from said passband;

means for spacing said first resonator from said second resonator;

means for coupling said transducer means of said first and second resonator electrically in phase inverted relation to generate additive voltages within said passband and cancelative voltages outside said passband;

the transducer means of said first resonator comprising piezoelectric transducer means mounted at the root of said first cantilever bar and said velocity source and the transducer means of said second resonator comprising piezoelectric transducer means mounted at the root of said second cantilever bar between said second cantilever bar and said velocity source;

wherein said transducer means of said first resonator comprises a pair of piezoelectric transducers polarized along their length in opposite directions, bonded together along their length, and bonded at one end to the root end of said first bar and bonded at the other end to said velocity source; and wherein said transducer means of said second resonator comprises a pair of piezoelectric transducers polarized along their length in opposite directions, bonded together along their length, and bonded at one end to the root end of said second bar and bonded at the other end to said velocity source.

* * * * *